United States Patent [19]

Perrot et al.

[11] Patent Number: 4,518,569
[45] Date of Patent: May 21, 1985

[54] PROCESS FOR CLEANING THE INNER WALLS OF A REACTOR

[75] Inventors: Michel Perrot, Orsay; Michel Jaccaud, Lyons, both of France

[73] Assignee: Pechine Ugine Kuhlmann, Paris, France

[21] Appl. No.: 131,095

[22] Filed: Mar. 18, 1980

Related U.S. Application Data

[63] Continuation of Ser. No. 824,720, Aug. 15, 1977, abandoned.

[30] Foreign Application Priority Data

Sep. 2, 1976 [FR] France .................................. 76 26954

[51] Int. Cl.³ .............................................. C01G 43/06
[52] U.S. Cl. .......................................... 423/19; 134/4; 134/5; 423/253; 423/258
[58] Field of Search .................... 423/19, 258, 253; 134/4, 5

[56] References Cited

U.S. PATENT DOCUMENTS

| | | | |
|---|---|---|---|
| 2,830,873 | 4/1958 | Katz et al. | 423/19 |
| 3,010,784 | 11/1961 | Gorton et al. | 423/19 |
| 3,236,688 | 2/1966 | Kahn | 134/4 |
| 3,403,986 | 10/1968 | Delange et al. | 423/258 |
| 3,697,235 | 10/1972 | Ogle | 423/253 |
| 3,720,748 | 3/1973 | Massonne | 423/258 |
| 3,825,650 | 7/1974 | Gustison et al. | 423/19 |
| 3,867,410 | 2/1975 | Brand et al. | 134/5 |
| 3,869,479 | 3/1975 | Barth et al. | 134/5 |
| 3,941,870 | 3/1976 | Ekstrom et al. | 423/258 |
| 4,003,980 | 1/1977 | Watt et al. | 423/261 |
| 4,031,029 | 6/1977 | Colter et al. | 423/19 |
| 4,119,559 | 10/1978 | Maas et al. | 423/258 |
| 4,202,861 | 5/1980 | Bourgeois et al. | 423/19 |
| 4,311,678 | 1/1982 | Jacob et al. | 423/258 |

FOREIGN PATENT DOCUMENTS 51-005236  1/1976  Japan ........................................ 134/4

*Primary Examiner*—Edward A. Miller
*Attorney, Agent, or Firm*—Dennison, Meserole, Pollack & Scheiner

[57] ABSTRACT

A physico-chemical cleaning process for the inner walls of a reactor which serves to maintain these walls in a state close to their main initial characteristics necessitated by a fluorination reaction, said characteristics being degraded by the deposition of a parasitic phase during the reaction, said initial characteristics being maintained by the use of a protective agent belonging to the group constituted by at least one of the reagents, a product resulting from the reaction, a product foreign to the reaction, but compatible with the substances of the main reaction or by the reaction of a third substance with at least one of the reaction substances or a mixture thereof, forming a renewable protective film on the said walls. The protective agent can be deposited by condensation on the walls before, during or after the main reaction, and then vaporized. The protective agent can be in liquid form, and trickling along the walls.

4 Claims, No Drawings

PROCESS FOR CLEANING THE INNER WALLS OF A REACTOR

This is a continuation of application Ser. No. 824,720, filed Aug. 15, 1977.

The invention relates to a novel process for the physico-chemical cleaning of the inner walls of a reactor which enables them to be maintained in a state close to their main initial characteristics, thus preventing them from being covered by a parasitic phase which develops during the reaction.

The term "physico-chemical cleaning" is understood as defining means other than mechanical means which originates from a phenomenon linked with the specific characteristics of at least one of the constituents contained in a phase which is voluntarily brought into contact with the walls.

The expert has long been aware of the numerous, often insurmountable, difficulties involved in maintaining the essential characteristics of reactors due to the frequent appearance of a parasitic phase on the walls during the reaction, whereby the said parasitic phase, for example, varies the useful cross-section of the reactor or its heat exchange coefficients.

As this parasitic phase could lead to a deterioration in the basic characteristics of the reactors, numerous more or less successful solutions have been proposed by the expert for eliminating this phase.

Of the numerous known solutions described in the specialized literature for combating this phenomenon, a first type of cleaning process comprises a mechanical cleaning of the reactor by scraping the walls when the actual reaction is taking place by means, for example, of an anchor agitator, which rotates slowly and limits the thickness of the parasitic phase on the reactor walls or by the action of impacts, vibrations, brushing or the combined action of such means.

A second type of cleaning process which necessitates the stoppage of the reactor comprises performing a chemical treatment of the reactor walls accompanied by the solubilization or decomposition of the condensed phase.

Another type of physical cleaning process comprises melting or volatilizing the parasitic phase by heating the reactor walls. However, although this process appears attractive, it was found to be limited by the existence of a relatively low temperature threshold which could not be exceeded without causing significant and often irreversible damage to the reactor, said damage being manifested, for example, by corrosion of the walls, pitting, reductions in the mechanical qualities of the materials constituting the reactor, etc.

It has also been suggested that refractory materials be placed within the reactors to protect the walls against thermal shocks and limit the deposition of the parasitic phase by using materials having a low heat transfer coefficient. Although this suggestion has provided a solution for the problem in certain special cases, the incompatibility of this material with certain reagents or certain reaction products such as, for example, fluorine or fluorides has made its use illusory in numerous cases.

As the problem of cleaning the walls had not been satisfactorily solved because the processes proposed had the above-indicated disadvantages, and as this same problem had remained unsolved in connection with the elimination of parasitic phases on walls and constituted by products having a melting, boiling or sublimation point above the temperature threshold which could be withstood without damage by the reactor, the applicant continued research in this field and found and developed a greatly improved cleaning process which provides a genuine, effective solution to the difficulties encountered by the skilled expert.

The physico-chemical cleaning process for the inner walls of a reactor, according to the invention, which serves to keep said walls in a state close to their main initial characteristics necessitated by a fluorination reaction and which are deteriorated by the deposition of a parasitic phase during the reaction is characterized in that said characteristics are maintained due to the intervention of a "renewable protective agent" belonging to the group constituted by at least one of the reagents, a product resulting from the reaction, a product foreign to the reaction, but compatible with the reaction substances or obtained by reaction thereof with at least one of the reaction substances or a mixture thereof forming on the said walls a renewable protective film.

According to the invention, the renewable protective agent acts in a different way depending on whether it is vaporizable or is in a liquid state under conditions appropriate for the requirements of the reaction.

When the protective agent is vaporizable, the process, according to the invention, comprises incorporating the said agent into the parasitic phase constituted by less volatile products which it is desired to eliminate either by effecting a prior deposition on the walls of the reactor prior to the production of the latter, or by simultaneously effecting the deposition of the protective agent and the parasitic phase, or by the deposition of the protective agent following the deposition of the parasitic phase on the walls, said protective agent occupying the available spaces resulting from the porosity of the parasitic phase. It is also possible to simultaneously use two or more of the above embodiments for the deposition of the protective agent.

As stated hereinbefore, when a protective deposition is made in the form of a preliminary layer, prior to starting up the reactor, the reactor is operated in an intermediate manner. The reason is that as soon as the reactor starts operating, the parasitic phase is deposited on the walls for a time which greatly varies. As soon as the basic characteristics of the reactor start to deteriorate, it is stopped and physico-chemical cleaning of the walls takes place. On changing the operating conditions of the reactor, the protective agent which has been deposited beforehand on the walls is sublimed and causes the cracking and finally, the shattering of the parasitic phase which is collected in fragment form at the bottom of the reactor.

When the protective agent is deposited during the operation of the reactor, the parasitic phase is formed on the walls at the same time as the deposition of the protective agent. As a result of a slight variation in the operating conditions of the reactor and without it being necessary to stop the main reaction taking place, the protective agent is vaporized and on escaping, causes the breaking of the parasitic phase on the inner walls of the reactor.

Finally, in the case where the agent is deposited after the parasitic phase, the change in the reactor operating conditions can be affected both with the reactor operating and stopped.

The protective agent, according to the invention, can be produced in situ when it is one of the products resulting from the main reaction or by reaction of a third substance with at least one of the reagents introduced or at least one of the products formed. However, it can also be one of the reagents introduced into the reactor and, therefore, its introduction takes place in excess compared with the stoichiometry of the reaction. Finally, it can also be a third substance which is inert relative to the various reagents involved in the reaction.

When the renewable protective agent is in a liquid state, in accordance with the reactor operating conditions, it can fulfill its function in a different way because it is not deposited on the reactor walls and instead trickles along them in a continuous manner during the reaction. In this case, the renewable protective agent can comprise at least one of the gaseous reaction products which, by condensation on the walls, brings about the trickling phenomenon causing a repeated washing of said walls. However, the protective agent can also be inert relative to the reagents and reaction products. Thus, if it is initially gaseous, it can be introduced in a continuous manner into the reactor at the same time as the reagents and, due to the reactor operating conditions, it is condensed on the walls fulfilling its protective function. However, the protective agent can also be in liquid form prior to its introduction. It is then chosen in such a way that it is in the liquid state when subject to the internal conditions of the reactor. Finally, the protective agent can initially be in a solid state and pass into a liquid state when introduced into the reactor. It fulfills the same function as the above-indicated liquid or gaseous protective agents.

Finally, it may be advantageous within the scope of the invention to combine the action of protective agents in their solid and liquid condensate forms by producing a composite protective form.

The process, according to the invention, relates to the cleaning of reactors in which fluorination reactions take place between gases, between gas and liquid, and between gas and solid, optionally in the presence of at least one gas which is foreign to the reaction. Other characteristics and advantages of the invention will be better understood from the following process examples.

EXAMPLE 1

Reagents constituted by a mixture of $UO_2$, fissium and $F_2$ are continuously introduced by means of an appropriate device into the upper end of a cooled vertical reactor, comprising a Monel tube having a diameter of 80 mm and a height of 1000 mm, the reactor wall being maintained at a temperature of minus 12° C. during the reaction. The term fissium is understood to mean a mixture of simulated fission products.

The solid charge constituted by a mixture of $UO_2$ and fissium containing 94% of $UO_2$ and 6% of fissium was introduced into the reactor at a flow rate of 1 kg/h. Fluorine was simultaneously introduced into the reactor at a rate of 375 l/h. When the $UO_2$-fissium mixture was brought into contact with the fluorine, a flame was spontaneously formed.

As the reactor wall was kept at a temperature of minus 12° C., a small fraction of the $UF_6$ gases resulting from the reaction condensed on the reactor wall at the same time as the fissium fluorides constituting the parasitic phase, whilst the larger fraction of $UF_6$ gases were extracted at the lower end of the reactor for filtration and treatment.

At the end of three hours, the fluorination reaction was stopped and then the reactor wall was heated. The $UF_6$ codeposited with the fissium fluoride on subliming caused the breaking of the condensed parasitic phase which was collected in the lower part of the reactor in a residue vessel.

The quantity of this solid residue constituted by fissium fluorides represented 5.83% by weight of the treated fuel, whilst only 0.37% by weight of the fuel remained on the reactor walls.

For comparison when working in the same reactor, but without any cooling of its walls, the same reagents as hereinbefore were introduced at the same flow rates. The $UF_6$ gas was extracted at the bottom of the reactor for filtration and treatment.

At the end of three hours, the reaction was stopped and the total solid residue resulting from the fissium was determined and was found to represent 6.9% of the charge and more than half, 3.7% was deposited on the reactor walls.

Thus, by applying the process according to the invention, the amount of solid residue deposited on the reactor walls was found to be one-tenth of that determined during the comparative test.

EXAMPLE 2

In accordance with the invention, a protective deposit was made in the form of a preliminary layer prior to the starting up of the reactor described in Example 1.

For this purpose, the reactor walls were cooled to minus 12° C. and said reactor was supplied with pure $UO_2$ and $F_2$ at the flow rates defined in Example 1, thus permitting the formation by condensation of a crystallized $UF_6$ coating on the said walls. A $UO_2$-fissium charge was then fluorinated according to Example 1.

After the same operating period as in Example 1, the fluorination reaction was stopped and the reactor wall heated. The $UF_6$ deposited as a preliminary layer sublimed and broke the parasitic phase deposited on the walls. The parasitic phase constituting the residue was then collected in a residue vessel placed at the bottom of the reactor.

The amount of solid residue resulting from the fissium was 6.7% of the charge, of which 0.1% remained on the reactor walls.

EXAMPLE 3

Using the same reactor as in Example 1, pure gaseous $UF_6$ was injected in whilst maintaining the outer wall of the reactor at ambient temperature. Thus, a solid $UF_6$ preliminary layer was obtained on the inner wall of the tube.

A $UO_2$-fissium charge was then fluorinated in conventional manner in accordance with the flow rates and conditions of Example 1. At the end of three hours, the fluorination reaction was stopped and the reactor walls heated.

The $UF_6$ deposited as a preliminary layer sublimed and cracked the condensed fissium fluoride parasitic phase. The parasitic phase was collected in the residue vessel placed at the bottom of the reactor.

The solid residue resulting from the fissium amounted to 6.4% by weight of the charge, of which 0.08% remained on the inner walls of the reactor.

EXAMPLE 4

Using the same reactor as in Example 1, a $UO_2$-fissium charge was fluorinated at a pressure of 12 bars, whilst maintaining the wall temperature at 70° C.

The $UO_2$-fissium charge was introduced at a rate of 1 kg/h and fluorine at a rate of 375 l/h. In addition, liquid $UF_6$ was introduced at a rate of 10 l/h as the protective agent.

At the pressure of 12 bars, the $UF_6$ produced in situ and that added contributed to the cleaning of the walls by trickling whilst the reaction was taking place, preventing the formation of the parasitic phase. The $UF_6$ was vaporized in the residue vessel and removed continuously.

The amount of solid residue collected constituted by fissium represented 6.7% by weight of the $UO_2$-fissium charge, whilst only 0.1% of residue, based on the charge, was left on the reactor walls.

EXAMPLE 5

Nitrosyl hexafluouranate $NOUF_6$ was produced by reacting $UF_6$ in gaseous state at a rate of 60 l/h with NO as a gas at a rate of 60 l/h in the reactor described hereinbefore.

During the reaction, it was found that most of the $NOUF_6$ was deposited in the form of a fine and very adhesive powder on the reactor walls.

In accordance with the process of the invention, i.e., by introducing into the reactor a supplement of 10 l/h of gaseous $UF_6$ as the protective agent, the supplementary $UF_6$ was crystallized on the reactor walls simultaneously with the deposition of $NOUF_6$. After subliming at the end of the operation, the $UF_6$ codeposited on the walls, 97.2% of $NOUF_6$ was collected in the residue vessel and only 2.8% on the walls.

EXAMPLE 6

$NH_4F$ was produced under atmospheric pressure at a rate of 2 kg/h by introducing $NH_3$ and gaseous HF into a known reactor.

It was then found that the reactor tended to become rapidly blocked by the reaction product of which 86% was collected directly, the remainder adhering to the reactor walls.

By performing the process according to the invention, i.e. by introducing into said reactor a supplement of 10 l/h of liquid HF, the latter was caused to trickle on the walls and the excess HF was vaporized at the bottom of the reactor and recycled. In this way, 99.9% of the product produced was collected at the bottom of the reactor.

We claim:

1. A process for cleaning the inner surfaces of the walls of a chemical reactor vessel in which a chemical reaction takes place wherein gaseous $UF_6$ is reacted with gaseous NO to produce $NOUF_6$, and wherein said reaction produces a parasitic phase of solid $NOUF_6$ which is deposited on said inner surfaces, comprising:
   concurrently with carrying out said reaction, cooling said inner surfaces, and introducing into said reactor excess gaseous $UF_6$, thereby depositing on said inner surfaces a protective agent of solid $UF_6$ concurrently with said parasitic phase; and subsequently
   heating said inner surfaces an amount sufficient to cause sublimation of said $UF_6$ protective agent, and thereby to cause shattering of said parasitic phase and removal of said parasitic phase from said inner surfaces.

2. A process for cleaning the inner surfaces of the walls of a chemical reactor vessel in which a chemical reaction takes place wherein a solid $UO_2$-fission products charge is fluorinated with gaseous fluorine, and wherein said reaction produces a parasitic phase comprising fission product fluorides which is deposited on said inner surfaces, comprising:
   concurrently with carrying out said reaction, maintaining said inner surfaces at about $-12°$ C., and simultaneously introducing said fluorine into said reactor, thereby forming gaseous $UF_6$ which condenses to a solid on said inner surfaces as a protective agent, co-depositing with said parasitic phase; and subsequently
   heating said inner surfaces an amount sufficient to cause sublimation of said protective agent, and thereby to cause shattering of said parasitic phase and removal of said parasitic phase from said inner surfaces.

3. A process for cleaning the inner surfaces of the walls of a chemical reactor vessel in which a chemical reaction takes place wherein a $UO_2$-fission products charge is fluorinated with gaseous fluorine, and wherein said reaction produces a parasitic phase comprising fission product fluorides which is deposited on said inner surfaces, comprising:
   prior to carrying out said reaction, depositing a layer of solid $UF_6$ on said inner surfaces as a protective agent by maintaining said inner surfaces at about $-12°$ C. and supplying said reactor with $UO_2$ and $F_2$, thereby condensing a coating of said $UF_6$ protective agent;
   carrying out said reaction, thereby causing said parasitic phase to be deposited on said inner surfaces; and subsequently
   heating said inner surfaces an amount sufficient to cause sublimation of said $UF_6$ protective agent, and thereby to cause shattering of said parasitic phase and removal of said parasitic phase from said inner surfaces.

4. A process for cleaning the inner surfaces of the walls of a chemical reactor vessel in which a chemical reaction takes place wherein a $UO_2$-fission products charge is continuously fluorinated with gaseous fluorine, and wherein said reaction produces a parasitic phase comprising fission product fluorides which is deposited on said inner surfaces, comprising:
   prior to carrying out said reaction, injecting gaseous $UF_6$ into said reactor with the outer walls of said reactor at ambient temperature and said inner surfaces at a temperature at which said $UF_6$ condenses on said inner surfaces as a protective agent;
   carrying out said reaction, thereby causing said parasitic phase to be deposited on said inner surfaces; and subsequently
   heating said inner surfaces an amount sufficient to cause sublimation of said protective agent, and thereby to cause shattering of said parasitic phase and removal of said parasitic phase from said inner surfaces.

* * * * *